(12) United States Patent
DeBruin

(10) Patent No.: US 7,649,109 B2
(45) Date of Patent: Jan. 19, 2010

(54) POLYESTER PRODUCTION SYSTEM EMPLOYING RECIRCULATION OF HOT ALCOHOL TO ESTERIFICATION ZONE

(75) Inventor: Bruce Roger DeBruin, Lexington, SC (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 11/635,411

(22) Filed: Dec. 7, 2006

(65) Prior Publication Data

US 2008/0139779 A1 Jun. 12, 2008

(51) Int. Cl.
*C07C 51/16* (2006.01)

(52) U.S. Cl. .................. 562/412; 562/405; 562/413; 562/414; 562/415; 562/416; 560/90

(58) Field of Classification Search .................. None
See application file for complete search history.

(56) References Cited

U.S. PATENT DOCUMENTS

| | | | |
|---|---|---|---|
| 1,422,182 A | 7/1922 | Curme | |
| 2,361,717 A | 10/1944 | Taylor | |
| 2,614,648 A | 10/1952 | Wilson | |
| 2,709,642 A | 5/1955 | Mann, Jr. et al. | |
| 2,727,882 A | 12/1955 | Vodonik | |
| 2,753,249 A | 7/1956 | Idenden et al. | |
| 2,820,815 A | 1/1958 | Matuszak et al. | |
| 2,829,153 A | 4/1958 | Vodonik | |
| 2,905,707 A | 9/1959 | Hurt et al. | |
| 2,973,341 A | 2/1961 | Hippe et al. | |
| 3,044,993 A | 7/1962 | Tiemersma | |
| 3,052,711 A | 9/1962 | Glogau et al. | |
| 3,054,776 A | 9/1962 | Higgins | |
| 3,110,547 A | 11/1963 | Emmert | |
| 3,113,843 A | 12/1963 | Li | |
| 3,161,710 A | 12/1964 | Turner | |
| 3,174,830 A | 3/1965 | Watzl et al. | |
| 3,185,668 A | 5/1965 | Meyer et al. | |
| 3,192,184 A | 6/1965 | Brill et al. | |
| 3,241,926 A | 3/1966 | Parker et al. | |
| 3,250,747 A | 5/1966 | Mitchell, Jr. et al. | |
| 3,251,657 A | 5/1966 | Bachmann et al. | |
| 3,254,965 A | 6/1966 | Ogle | |
| 3,376,353 A | 4/1968 | Tate | |
| 3,390,965 A | 7/1968 | Ditmar | |
| 3,402,023 A | 9/1968 | Dobo | |
| 3,427,287 A | 2/1969 | Pengilly | |
| 3,438,942 A | 4/1969 | Scheller et al. | |
| 3,442,868 A | 5/1969 | Ogata et al. | |
| 3,458,467 A | 7/1969 | Herrie et al. | |
| 3,468,849 A | 9/1969 | Rothert | |
| 3,480,587 A | 11/1969 | Porter | |
| 3,487,049 A | 12/1969 | Busot | |
| 3,496,146 A | 2/1970 | Mellichamp, Jr. | |
| 3,496,159 A | 2/1970 | Spence | |
| 3,496,220 A | 2/1970 | McCarty et al. | |
| 3,497,473 A | 2/1970 | Kemkes | |
| 3,507,905 A | 4/1970 | Girantet et al. | |
| 3,509,203 A | 4/1970 | Michaelis et al. | |
| 3,511,615 A | 5/1970 | Roget et al. | |
| 3,522,214 A | 7/1970 | Crawford et al. | |
| 3,534,082 A | 10/1970 | Armstrong et al. | |
| 3,551,396 A | 12/1970 | Lanthier | |
| 3,582,244 A | 6/1971 | Siclari et al. | |
| 3,590,070 A | 6/1971 | Martin et al. | |
| 3,590,072 A | 6/1971 | Leyboume | |
| 3,595,846 A | 7/1971 | Rouzier | |
| 3,600,137 A | 8/1971 | Girantet et al. | |
| 3,609,125 A | 9/1971 | Fujimoto et al. | |
| 3,639,448 A | 2/1972 | Matsuzawa et al. | |
| 3,644,096 A | 2/1972 | Lewis et al. | |
| 3,644,294 A | 2/1972 | Siclari et al. | |
| 3,644,483 A | 2/1972 | Griehl et al. | |
| 3,646,102 A | 2/1972 | Kobayashi et al. | |
| 3,647,758 A | 3/1972 | Ryffel et al. | |
| 3,651,125 A | 3/1972 | Lewis et al. | |
| 3,676,485 A | 7/1972 | Lewis et al. | |
| 3,684,459 A | 8/1972 | Tate et al. | |
| 3,689,461 A | 9/1972 | Balint et al. | |
| 3,697,579 A * | 10/1972 | Balint et al. | .................. 560/80 |
| 3,723,391 A | 3/1973 | Beer et al. | |
| 3,740,267 A | 6/1973 | Haylock et al. | |

(Continued)

FOREIGN PATENT DOCUMENTS

BE 780142 3/1972

(Continued)

OTHER PUBLICATIONS

Copending U.S. Appl. No. 11/506,105, filed Aug. 17, 2006, Bruce Roger DeBruin.

(Continued)

*Primary Examiner*—Peter G O'Sullivan
*Assistant Examiner*—Sudhakar Katakam
(74) *Attorney, Agent, or Firm*—Dannis V. Carmen; Bernard J. Graves, Jr.

(57) ABSTRACT

A polyester production process employing an esterification system that uses a distillation column to recover alcohol produced from an esterification zone and then recirculates the recovered alcohol back to the esterification zone without substantially cooling the recovered alcohol.

34 Claims, 1 Drawing Sheet

U.S. PATENT DOCUMENTS

| | | | |
|---|---|---|---|
| 3,781,213 A | 12/1973 | Siclari et al. |
| 3,787,479 A | 1/1974 | Grehl et al. |
| 3,819,585 A | 6/1974 | Funk et al. |
| 3,841,836 A | 10/1974 | Lunsford et al. |
| 3,849,379 A | 11/1974 | Jeurissen et al. |
| 3,867,349 A | 2/1975 | Heeg et al. |
| 3,892,798 A | 7/1975 | Heeg et al. |
| 3,927,982 A | 12/1975 | Chapman et al. |
| 3,927,983 A | 12/1975 | Gordon et al. |
| 3,960,820 A | 6/1976 | Pinney |
| 3,988,301 A | 10/1976 | Jeurissen et al. |
| 4,001,187 A | 1/1977 | Itabashi et al. |
| 4,008,048 A | 2/1977 | Hellemans et al. |
| 4,019,866 A | 4/1977 | Jaswal et al. |
| 4,020,049 A | 4/1977 | Rinehart |
| 4,028,307 A | 6/1977 | Ure |
| 4,032,563 A | 6/1977 | Harper et al. |
| 4,039,515 A | 8/1977 | Rebhan et al. |
| 4,046,718 A | 9/1977 | Mass et al. |
| 4,049,638 A | 9/1977 | Doerfel et al. |
| 4,056,514 A | 11/1977 | Strehler et al. |
| 4,064,112 A | 12/1977 | Rothe et al. |
| 4,077,945 A | 3/1978 | Heinze et al. |
| 4,079,046 A | 3/1978 | Brignac et al. |
| 4,089,888 A | 5/1978 | Tokumitsu et al. |
| 4,097,468 A | 6/1978 | James et al. |
| 4,100,142 A | 7/1978 | Schaefer et al. |
| 4,110,316 A | 8/1978 | Edging et al. |
| 4,118,582 A | 10/1978 | Walker |
| 4,122,112 A | 10/1978 | Koda et al. |
| 4,146,729 A | 3/1979 | Goodley et al. |
| 4,148,693 A | 4/1979 | Williamson |
| 4,196,168 A | 4/1980 | Lewis |
| 4,200,145 A | 4/1980 | Underwood |
| 4,204,070 A | 5/1980 | Suzuki et al. |
| 4,212,963 A | 7/1980 | Lehr et al. |
| 4,223,124 A | 9/1980 | Broughton et al. |
| 4,230,818 A | 10/1980 | Broughton, Jr. et al. |
| 4,235,844 A | 11/1980 | Sterzel et al. |
| 4,238,593 A | 12/1980 | Duh |
| 4,254,246 A * | 3/1981 | Dicoi et al. ............... 526/68 |
| 4,289,871 A | 9/1981 | Rowan et al. |
| 4,289,895 A | 9/1981 | Burkhardt et al. |
| 4,339,570 A | 7/1982 | Muschelknautz et al. |
| 4,346,193 A | 8/1982 | Warfel |
| 4,361,462 A | 11/1982 | Fujii et al. |
| 4,365,078 A | 12/1982 | Shelley |
| 4,382,139 A | 5/1983 | Kapteina et al. |
| 4,383,093 A | 5/1983 | Shiraki et al. |
| 4,410,750 A | 10/1983 | Langer, Jr. |
| 4,424,301 A | 1/1984 | Klippert et al. |
| 4,440,924 A | 4/1984 | Kuze et al. |
| 4,452,956 A | 6/1984 | Moked et al. |
| 4,472,558 A | 9/1984 | Casper et al. |
| 4,499,226 A | 2/1985 | Massey et al. |
| 4,529,787 A | 7/1985 | Schmidt et al. |
| 4,542,196 A | 9/1985 | Morris et al. |
| 4,548,788 A | 10/1985 | Morris et al. |
| 4,550,149 A | 10/1985 | Morris et al. |
| 4,551,309 A | 11/1985 | Morris et al. |
| 4,551,510 A | 11/1985 | Morris et al. |
| 4,554,343 A | 11/1985 | Jackson, Jr. et al. |
| 4,555,384 A | 11/1985 | Morris et al. |
| 4,588,560 A | 5/1986 | Degnan et al. |
| 4,612,363 A | 9/1986 | Sasaki et al. |
| 4,670,580 A | 6/1987 | Maurer |
| 4,675,377 A | 6/1987 | Mobley et al. |
| 4,680,345 A | 7/1987 | Kobayashi et al. |
| 4,680,376 A | 7/1987 | Heinze et al. |
| 4,721,575 A | 1/1988 | Binning et al. |
| 4,952,302 A | 8/1990 | Leach |
| 4,952,627 A | 8/1990 | Morita et al. |
| 4,973,655 A | 11/1990 | Pipper et al. |
| 5,037,955 A | 8/1991 | Dighton |
| 5,041,525 A | 8/1991 | Jackson |
| 5,064,935 A | 11/1991 | Jackson et al. |
| 5,162,488 A | 11/1992 | Mason |
| 5,185,426 A | 2/1993 | Verheijen et al. |
| 5,194,525 A | 3/1993 | Miura et al. |
| 5,202,463 A | 4/1993 | Ruszkay |
| 5,236,558 A | 8/1993 | Buyalos et al. |
| 5,243,022 A | 9/1993 | Kim et al. |
| 5,245,057 A | 9/1993 | Shirtum |
| 5,254,288 A | 10/1993 | Verheijen et al. |
| 5,294,305 A | 3/1994 | Craft, Sr. et al. |
| 5,300,626 A | 4/1994 | Jehl et al. |
| 5,324,853 A | 6/1994 | Jones et al. |
| 5,340,906 A | 8/1994 | Shirokura et al. |
| 5,340,907 A | 8/1994 | Yau et al. |
| 5,384,389 A | 1/1995 | Alewelt et al. |
| 5,385,773 A | 1/1995 | Yau et al. |
| 5,413,861 A | 5/1995 | Gallo |
| 5,434,239 A | 7/1995 | Bhatia |
| 5,464,590 A | 11/1995 | Yount et al. |
| 5,466,419 A | 11/1995 | Yount et al. |
| 5,466,765 A | 11/1995 | Haseltine et al. |
| 5,466,776 A | 11/1995 | Krautstrunk et al. |
| 5,476,919 A | 12/1995 | Schaeffer |
| 5,478,909 A | 12/1995 | Jehl et al. |
| 5,480,616 A | 1/1996 | Richardson et al. |
| 5,484,882 A | 1/1996 | Takada et al. |
| 5,496,469 A | 3/1996 | Scraggs et al. |
| 5,519,112 A | 5/1996 | Harazoe et al. |
| 5,536,856 A | 7/1996 | Harrison et al. |
| 5,573,820 A | 11/1996 | Harazoe et al. |
| 5,594,077 A | 1/1997 | Groth et al. |
| 5,602,216 A | 2/1997 | Juvet |
| 5,648,437 A | 7/1997 | Fischer et al. |
| 5,650,536 A | 7/1997 | Dankworth et al. |
| 5,681,918 A | 10/1997 | Adams et al. |
| 5,688,898 A | 11/1997 | Bhatia |
| 5,739,219 A | 4/1998 | Fischer et al. |
| 5,750,079 A | 5/1998 | Ueda et al. |
| 5,753,190 A | 5/1998 | Haseltine et al. |
| 5,753,784 A | 5/1998 | Fischer et al. |
| 5,786,443 A | 7/1998 | Lowe |
| 5,811,496 A | 9/1998 | Iwasyk et al. |
| 5,816,700 A | 10/1998 | Starke, Sr. et al. |
| 5,830,981 A | 11/1998 | Koreishi et al. |
| 5,849,849 A | 12/1998 | Bhatia |
| 5,889,127 A | 3/1999 | Iiyama et al. |
| 5,898,058 A | 4/1999 | Nichols et al. |
| 5,902,865 A | 5/1999 | Gausepohl et al. |
| 5,905,096 A | 5/1999 | Lay et al. |
| 5,922,828 A | 7/1999 | Schiraldi |
| 5,932,105 A | 8/1999 | Kelly |
| 6,069,228 A | 5/2000 | Alsop et al. |
| 6,096,838 A | 8/2000 | Nakamoto et al. |
| 6,100,369 A | 8/2000 | Miyajima et al. |
| 6,103,859 A * | 8/2000 | Jernigan et al. ............. 528/307 |
| 6,111,035 A | 8/2000 | Sakamoto et al. |
| 6,111,064 A | 8/2000 | Maurer et al. |
| 6,113,997 A | 9/2000 | Massey et al. |
| 6,127,493 A | 10/2000 | Maurer et al. |
| 6,174,970 B1 | 1/2001 | Braune |
| 6,252,034 B1 | 6/2001 | Uenishi et al. |
| 6,339,031 B1 | 1/2002 | Tan |
| 6,355,738 B2 | 3/2002 | Nakamachi |
| 6,359,106 B1 | 3/2002 | Nakamoto et al. |
| 6,399,031 B1 | 6/2002 | Herrmann et al. |
| 6,458,916 B1 | 10/2002 | Yamaguchi et al. |
| 6,545,176 B1 | 4/2003 | Tsay et al. |
| 6,551,517 B1 | 4/2003 | Sentagnes et al. |
| 6,576,774 B2 | 6/2003 | Scardino et al. |

| | | | | | | |
|---|---|---|---|---|---|---|
| 6,590,062 B2 | 7/2003 | Yamaguchi et al. | JP | 51 29460 A | 3/1976 | |
| 6,623,643 B2 | 9/2003 | Chisholm et al. | JP | 51 100036 A | 9/1976 | |
| 6,631,892 B1 | 10/2003 | Erickson | JP | 51 136788 A | 11/1976 | |
| 6,642,407 B2 | 11/2003 | Rao et al. | JP | 51 136789 A | 11/1976 | |
| 6,703,454 B2 | 3/2004 | DeBruin | JP | 52 51495 A | 4/1977 | |
| 6,723,826 B2 | 4/2004 | Yamaguchi et al. | JP | 52 71432 A | 6/1977 | |
| 6,815,525 B2 | 11/2004 | DeBruin | JP | 52 78845 A | 7/1977 | |
| 6,861,494 B2 | 3/2005 | Debruin | JP | 52 83424 A | 7/1977 | |
| 6,906,164 B2 | 6/2005 | DeBruin | JP | 52 87133 A | 7/1977 | |
| 6,916,939 B2 | 7/2005 | Yamane et al. | JP | 53 31793 A | 3/1978 | |
| 7,008,546 B2 | 3/2006 | Edmondson | JP | 53 34894 A | 3/1978 | |
| 7,049,462 B2 | 5/2006 | Nagare et al. | JP | 54 41833 A | 4/1979 | |
| 7,074,879 B2 | 7/2006 | Debruin et al. | JP | 54 76535 A | 6/1979 | |
| 2002/0128399 A1 | 9/2002 | Nakamoto et al. | JP | 54 79242 A | 6/1979 | |
| 2002/0161166 A1 | 10/2002 | Nakane et al. | JP | 54 100494 A | 8/1979 | |
| 2002/0180099 A1 | 12/2002 | Keillor, III | JP | 54 157536 A | 12/1979 | |
| 2003/0019126 A1 | 1/2003 | Greive | JP | 55 43128 A | 3/1980 | |
| 2003/0037910 A1 | 2/2003 | Smyrnov | JP | 55 108422 A | 8/1980 | |
| 2003/0104203 A1 | 6/2003 | Tam et al. | JP | 55 135133 A | 10/1980 | |
| 2003/0133856 A1 | 7/2003 | Le | JP | 58 129020 A | 8/1983 | |
| 2004/0068070 A1 | 4/2004 | Martan et al. | JP | 59 47226 A | 3/1984 | |
| 2004/0197618 A1 | 10/2004 | Harada et al. | JP | 59 53530 A | 3/1984 | |
| 2004/0249111 A1 | 12/2004 | Debruin | JP | 59 68326 A | 4/1984 | |
| 2005/0054814 A1* | 3/2005 | DeBruin ............ 528/308.1 | JP | 59 71326 A | 4/1984 | |
| 2005/0059782 A1 | 3/2005 | Andrist et al. | JP | 60 15421 A | 1/1985 | |
| 2005/0222371 A1 | 10/2005 | Wilhelm et al. | JP | 60 72845 A | 4/1985 | |
| 2006/0008661 A1 | 1/2006 | Wijesundara et al. | JP | 60 115551 A | 6/1985 | |
| 2006/0251546 A1 | 11/2006 | Yount et al. | JP | 60 120839 A | 6/1985 | |
| 2006/0251547 A1 | 11/2006 | Windes et al. | JP | 60 163918 A | 8/1985 | |
| | | | JP | 60 226846 A | 11/1985 | |

FOREIGN PATENT DOCUMENTS

| | | | | | |
|---|---|---|---|---|---|
| BR | 7906279 | 7/1981 | JP | 62 207325 A | 9/1987 |
| DE | 2200832 | 1/1972 | JP | 62 292831 A | 12/1987 |
| DE | 125 798 | 5/1977 | JP | 64 56726 A | 3/1989 |
| DE | 126 073 | 6/1977 | JP | 1 102044 A | 4/1989 |
| DE | 146 298 | 2/1981 | JP | 3 192118 A | 8/1991 |
| DE | 206 558 | 2/1984 | JP | 3 292323 A | 12/1991 |
| DE | 229 415 | 11/1985 | JP | 5-78402 | 3/1993 |
| DE | 4235785 A1 | 5/1994 | JP | 5 155994 A | 6/1993 |
| DE | 19525579 C1 | 12/1996 | JP | 6 247899 A | 9/1994 |
| DE | 195 37 930 | 4/1997 | JP | 7 118208 A | 5/1995 |
| DE | 10336164 A1 | 3/2005 | JP | 7 173268 A | 7/1995 |
| DE | 102004038466 A1 | 10/2005 | JP | 7 238151 A | 9/1995 |
| DE | 102004034708 A1 | 2/2006 | JP | 7313865 A | 12/1995 |
| EP | 0 070 707 A1 | 1/1983 | JP | 8 198960 A | 8/1996 |
| EP | 0105111 A1 | 7/1983 | JP | 8 283398 A | 10/1996 |
| EP | 0 850 962 A2 | 7/1998 | JP | 10 36495 A | 2/1998 |
| EP | 0 999 228 A2 | 5/2000 | JP | 10 259244 A | 9/1998 |
| EP | 1 065 193 A1 | 1/2001 | JP | 11 092555 A | 4/1999 |
| FR | 2168990 | 9/1973 | JP | 11 106489 A | 4/1999 |
| FR | 2302778 A1 | 3/1975 | JP | 11 217429 A | 8/1999 |
| GB | 777128 | 6/1957 | JP | 2000/095851 A | 4/2000 |
| GB | 777628 | 6/1957 | JP | 2004238329 | 8/2004 |
| GB | 1001787 | 8/1965 | KR | 1993-0005144 B1 | 6/1993 |
| GB | 1013034 | 12/1965 | KR | 1994-0011540 B1 | 3/1994 |
| GB | 1055918 | 1/1967 | NL | 6704303 | 9/1967 |
| GB | 1122538 | 8/1968 | PL | 136188 | 8/1987 |
| GB | 1154538 | 6/1969 | SU | 973552 | 11/1982 |
| GB | 1277376 | 6/1972 | WO | 9529752 A1 | 11/1995 |
| GB | 1320769 | 6/1973 | WO | WO 96/22318 | 7/1996 |
| GB | 2010294 | 6/1979 | WO | WO 98/08602 | 3/1998 |
| GB | 2020194 A | 11/1979 | WO | WO 98/10007 | 3/1998 |
| GB | 2 052 535 A | 1/1981 | WO | WO 99/16537 | 4/1999 |
| GB | 2052535 | 1/1981 | WO | 9939815 A1 | 8/1999 |
| JP | 42 4993 B | 3/1967 | WO | WO 02/26841 A1 | 4/2002 |
| JP | 42 18353 B | 9/1967 | WO | WO 02/096975 A1 | 12/2002 |
| JP | 47 39043 A | 4/1971 | WO | WO 03/006526 A1 | 1/2003 |
| JP | 48 94795 A | 12/1973 | WO | 2006083250 A1 | 8/2006 |
| JP | 49 28698 A | 3/1974 | WO | 2007065211 A1 | 6/2007 |
| JP | 49 34593 A | 3/1974 | | | |
| JP | 49 105893 A | 10/1974 | | | |
| JP | 50 82197 A | 7/1975 | | | |

WO WO 2007/065211 6/2007

OTHER PUBLICATIONS

Copending U.S. Appl. No. 11/506,099, filed Aug. 17, 2006, Bruce Roger DeBruin.
Copending U.S. Appl. No. 11/506,131, filed Aug. 17, 2006, Bruce Roger DeBruin.
Copending U.S. Appl. No. 11/506,346, filed Aug. 17, 2006, Bruce Roger DeBruin.
Copending U.S. Appl. No. 11/506,132, filed Aug. 17, 2006, Bruce Roger DeBruin.
Copending U.S. Appl. No. 11/635,360, filed Dec. 7, 2006, Bruce Roger DeBruin.
Copending U.S. Appl. No. 11/635,448, filed Dec. 7, 2006, Bruce Roger DeBruin.
Copending U.S. Appl. No. 10/819,432, filed Apr. 7, 2004, Bruce Roger DeBruin.
Copending U.S. Appl. No. 10/919,931, filed Aug. 17, 2004, Bruce Roger DeBruin.
USPTO office action dated Sep. 6, 2005 for copending U.S. Appl. No. 10/919,931.
USPTO office action dated Apr. 10, 2006 for copending U.S. Appl. No. 10/919,931.
Perry, Robert H. and Green, Don, "Flow in Pipes and Channels," Perry's Chemical Engineer's Handbook, 1984, pp. 5-23-5-40, $6^{th}$ Edition, McGraw-Hill, United States.
Perry, Robert H. and Green, Don, "Fluid and Particle Mechanics," Perry's Chemical Engineer's Handbook, 1984, pp. 5-40 to 5-41, $6^{th}$ Edition, McGraw-Hill, United States.
Perry,. Robert H. and Green, Don, "Fluid and Particle Mechanics," Perry's Chemical Engineer's Handbook, 1984, 14-82 to 14-95, $6^{th}$ Edition, McGraw-Hill, United States.
Nauman, E.B., "Enhancement of Heat Transfer and Thermal Homogenity with Motionless Mixers," American Institute of Chemical Engineer's Journal, 1979, pp. 246-258, vol. 25, No. 2.
Brodkey, Robert S., "Multiphase Phenomena I: Pipe Flow," The Phenomena of Fluid Motions, 1967, pp. 456-538, Addison-Wesley Publishing Company, United States.
Gupta, S.K. And Kumar, Anil, "Polyester Reactors," Plenum Chemical Engineering Series, 1987, pp. 241-318, Chapter 8, Plenum Press, New York.
Stahl, Wegmann, Von Rohr; Tubular Reactor for Liquid Reactions with Gas Release, 2003, Catalysis Today, 79-80, pp. 89-95.
Santosh K. Gupta & Anil Kumar, "Step Growth Polymerization," The Plenum Chemical Engineering Series, 1987, Chapter 8, Plenum Press.
Perry's Chemical Engineers' Handbook, $7^{th}$ Edition, pp. 8-49 to 8-50 and 14-82 to 14-95.
USPTO Office Action dated Dec. 4, 2007 for copending U.S. Appl. No. 11/891,149.
USPTO office action dated Oct. 11, 2007 for copending U.S. Appl. No. 11/820,244.
USPTO Notice of Allowance dated Oct. 11, 2007 for copending U.S. Appl. No. 10/919,931.
Copending U.S. Appl. No. 11/891,149, filed Aug. 9, 2007, Bruce Roger Debruin.
Copending U.S. Appl. No. 11/820,244, filed Jun. 19, 2007, Bruce Roger DeBruin.
Copending U.S. Appl. No. 11/776,597, filed Jul. 12, 2007, Bruce Roger DeBruin et al.
Copending U.S. Appl. No. 11/776,599, filed Jul. 12, 2007, Bruce Roger DeBruin.
Copending U.S. Appl. No. 11/776,598, filed Jul. 12, 2007, Bruce Roger DeBruin et al.
Copending U.S. Appl. No. 11/776,595, filed Jul. 12, 2007, Bruce Roger DeBruin et al.
Copending U.S. Appl. No. 11/776,600, filed Jul. 12, 2007, Bruce Roger DeBruin et al.
Copending U.S. Appl. No. 11/776,587, filed Jul. 12, 2007, Bruce Roger DeBruin et al.
Copending U.S. Appl. No. 11/776,603, filed Jul. 12, 2007, Bruce Roger DeBruin et al.
Copending U.S. Appl. No. 11/776,591, filed Jul. 12, 2007, Bruce Roger DeBruin et al.
USPTO Office Action dated Jul. 2, 2007 for copending U.S. Appl. No. 11/506,105.
USPTO office action dated Jul. 2, 2007 for copending U.S. Appl. No. 11/506,132.
USPTO office action dated Jul. 2, 2007 for copending U.S. Appl. No. 11/506,131.
USPTO Notice of Allowance dated Jan. 10, 2008 for copending U.S. Appl. No. 11/506,131.
USPTO Office Action dated Jan. 31, 2008 for copending U.S. Appl. No. 11/506,132.
USPTO Notice of Allowance dated Feb. 13, 2008 for copending U.S. Appl. No. 11/820,244.
USPTO Office Action dated Jan. 25, 2008 for copending U.S. Appl. No. 11/506,105.
USPTO Notice of Allowance dated Mar. 25, 2008 for copending U.S. Appl. No. 11/506,132.
USPTO Notice of Allowance dated Apr. 29, 2008 for copending U.S. Appl. No. 11/891,149.
USPTO Office Action dated May 7, 2008 for copending U.S. Appl. No. 11/506,105.
USPTO Office Action dated Jul. 18, 2008 for copending U.S. Appl. No. 11/506,346.
USPTO Notice of Allowance dated Jan. 2, 2009 for copending U.S. Appl. No. 11/891,149.
USPTO Office Action dated Sep. 22, 2008 for copending U.S. Appl. No. 11/891,149.
USPTO Notice of Allowance dated Oct. 7, 2008 for copending U.S. Appl. No. 11/506,105.
USPTO Office Action dated Dec. 5, 2008 for copending U.S. Appl. No. 12/173,354.
USPTO Office Action dated Jan. 30, 2009 for copending U.S. Appl. No. 11/715,546.
USPTO Notice of Allowance dated Jan. 28, 2009 for copending U.S. Appl. No. 11/506,346.
Copending U.S. Appl. No. 12/173,354, filed Jul. 15, 2008, Bruce Roger DeBruin.
Copending U.S. Appl. No. 12/186,739, filed Aug. 6, 2008, Bruce Roger DeBruin.
Ekivina, N. I. et al., "Structure Formation in Terephthalic Acid Pastes," 1968, Chemical Abstracts Service, Columbus, OH.

* cited by examiner

POLYESTER PRODUCTION SYSTEM EMPLOYING RECIRCULATION OF HOT ALCOHOL TO ESTERIFICATION ZONE

BACKGROUND OF THE INVENTION

1. Field of the Invention

This invention relates to a system for producing melt-phase polyesters. In another aspect, the invention concerns an esterification system utilizing a hot alcohol recirculation stream.

2. Description of the Prior Art

Melt-phase polymerization can be used to produce a variety of polyesters, such as, for example, polyethylene terephthalate (PET). PET is widely used in beverage, food, and other containers, as well as in synthetic fibers and resins. Advances in process technology coupled with increased demand have lead to an increasingly competitive market for the production and sale of PET. Therefore, a low-cost, high-efficiency process for producing PET is desirable.

Generally, melt-phase polyester production facilities, including those used to make PET, employ an esterification stage and a polycondensation stage. In the esterification stage, polymer raw materials (i.e., reactants) are converted to polyester monomers and/or oligomers. In the polycondensation stage, polyester monomers exiting the esterification stage are converted into a polymer product having the desired final chain length.

In most conventional melt-phase polyester production facilities, esterification is carried out in one or more mechanically agitated reactors, such as, for example, continuous stirred tank reactors (CSTRs). However, CSTRs and other mechanically agitated reactors have a number of drawbacks that can result in increased capital, operating, and/or maintenance costs for the overall polyester production facility. For example, the mechanical agitators and various control equipment typically associated with CSTRs are complex, expensive, and can require extensive maintenance. Further, conventional CSTRs frequently employ internal heat exchange tubes that occupy a portion of the reactor's internal volume. In order to compensate for the loss in effective reactor volume, CSTRs with internal heat exchange tubes require a larger overall volume, which increases capital costs. Further, internal heat exchange coils typically associated with CSTRs can undesirably interfere with the flow patterns of the reaction medium within the vessel, thereby resulting in a loss of conversion. To increase product conversion, many conventional polyester production facilities have employed multiple CSTRs operating in series, which further increases both capital and operating costs.

Thus, a need exists for a high efficiency polyester process that minimizes capital, operational, and maintenance costs while maximizing product conversion.

SUMMARY OF THE INVENTION

In one embodiment of the present invention, there is provided a process comprising: (a) subjecting a reaction medium to esterification in an esterification zone to thereby produce a first vapor product and a first liquid product; (b) subjecting at least a portion of the first vapor product to distillative separation in a distillation zone to thereby produce a second vapor product and a second liquid product; (c) combining at least a portion of the second liquid product with at least a portion of the first liquid product to thereby produce a combined liquid, wherein the temperature of the second liquid product when combined with the first liquid product is not more than about 100° C. cooler than the temperature of the second liquid product when withdrawn from the distillation zone; and (d) introducing an esterification feed comprising at least a portion of the combined liquid into the esterification zone.

In another embodiment of the present invention, there is provided a process comprising: (a) subjecting a reaction medium comprising terephthalic acid and ethylene glycol to esterification in a first esterification zone defined within the tubes of a shell-and-tube heat exchanger to thereby produce a first liquid product having a conversion of at least about 50 percent; (b) subjecting at least a portion of the first liquid product to further esterification in a second esterification zone defined within an esterification reactor to thereby produce a second liquid product and a second vapor product, wherein the second liquid product has a higher conversion than the first liquid product, wherein the esterification reactor defines a fluid inlet for receiving the first liquid product, a vapor outlet for discharging the second vapor product, and a liquid outlet for discharging the second liquid product, wherein the vapor and liquid outlets are horizontally spaced from the fluid inlet by a distance greater than the maximum vertical dimension of the second esterification zone; (c) subjecting at least a portion of the second vapor product to distillative separation in a distillation zone to thereby produce a third vapor product and a third liquid product, wherein the third vapor product comprises at least about 50 mole percent water and the third liquid product comprises at least about 50 mole percent ethylene glycol; (d) combining at least a portion of the third liquid product with at least a portion of the second liquid product to thereby produce a combined liquid, wherein the temperature of the third liquid product when combined with the second liquid product is not more than 100° C. cooler than the temperature of the third liquid product when withdrawn from the distillation zone; and (e) introducing at least a portion of the combined liquid into the first esterification zone.

BRIEF DESCRIPTION OF THE DRAWINGS

Certain embodiments of the present invention are described in detail below with reference to the enclosed figure, wherein.

DETAILED DESCRIPTION

Figure 1:
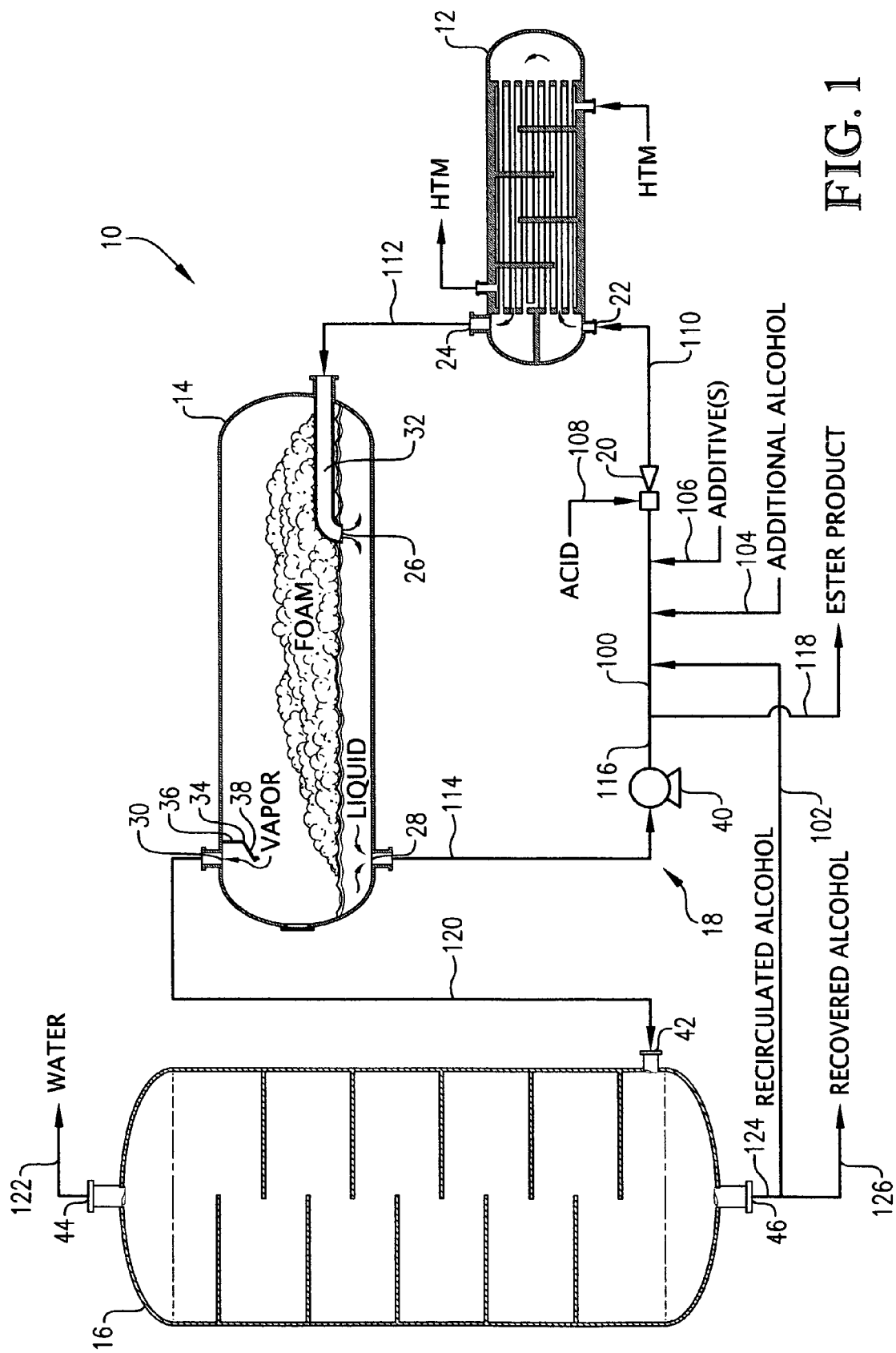
FIG. 1 is a schematic depiction of an esterification system configured in accordance with one embodiment of the present invention and suitable for use in a melt-phase polyester production facility.

The present invention can be employed in melt-phase polyester production facilities capable of producing a variety of polyesters from a variety of starting materials. As used herein, the term "polyester" also includes polyester derivatives, such as, for example, polyetheresters, polyester amides, and polyetherester amides. Examples of melt-phase polyesters that can be produced in accordance with the present invention include, but are not limited to, homopolymers and copolymers of polyethylene terephthalate (PET), PETG (PET modified with 1,4-cyclohexane-dimethanol (CHDM) comonomer), fully aromatic or liquid crystalline polyesters, biodegradable polyesters, such as those comprising butanediol, terephthalic acid and adipic acid residues, poly(cyclohexane-dimethylene terephthalate) homopolymer and copolymers, and homopolymers and copolymers of CHDM and cyclohexane dicarboxylic acid or dimethyl cyclohexanedicarboxylate.

In one embodiment of the present invention, polyester starting materials comprising at least one alcohol and at least one acid are subjected to esterification in an initial stage of the process. The acid starting material can be a dicarboxylic acid such that the final polyester product comprises at least one dicarboxylic acid residue having in the range of from about 4 to about 15 or from 8 to 12 carbon atoms. Examples of dicarboxylic acids suitable for use in the present invention can include, but are not limited to, terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, dipheny-3,4'-dicarboxylic acid, 2,2,-dimethyl-1,3-propandiol, dicarboxylic acid, succinic acid, glutaric acid, adipic acid, azelaic acid, sebacic acid, and mixtures thereof. In one embodiment, the acid starting material can be a corresponding ester, such as dimethyl terephthalate instead of terephthalic acid.

The alcohol starting material can be a diol such that the final polyester product can comprise at least one diol residue, such as, for example, those originating from cycloaliphatic diols having in the range of from about 3 to about 25 carbon atoms or 6 to 20 carbon atoms. Suitable diols can include, but are not limited to, ethylene glycol (EG), diethylene glycol, triethylene glycol, 1,4-cyclohexane-dimethanol, propane-1,3-diol, butane-1,4-diol, pentane-1,5-diol, hexane-1,6-diol, neopentylglycol, 3-methylpentanediol-(2,4), 2-methylpentanediol-(1,4), 2,2,4-trimethylpentane-diol-(1,3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2,4,4tetramethyl-cyclobutanediol, 2,2-bis-(3-hydroxyethoxyphenyl)-propane, 2,2-bis-(4-hydroxy-propoxyphenyl)-propane, isosorbide, hydroquinone, BDS-(2,2-(sulfonylbis)4,1-phenyleneoxy)) bis(ethanol), and mixtures thereof.

In addition, in one embodiment, the starting materials can comprise one or more comonomers. Suitable comonomers can include, for example, comonomers comprising terephthalic acid, dimethyl terephthalate, isophthalic acid, dimethyl isophthalate, dimethyl-2,6-naphthalenedicarboxylate, 2,6-naphthalene-dicarboxylic acid, ethylene glycol, diethylene glycol, 1,4-cyclohexane-dimethanol (CHDM), 1,4-butanediol, polytetramethyleneglyocl, trans-DMCD, trimellitic anhydride, dimethyl cyclohexane-1,4 dicarboxylate, dimethyl decalin-2,6 dicarboxylate, decalin dimethanol, decahydronaphthalane 2,6-dicarboxylate, 2,6-dihydroxymethyl-decahydronaphthalene, hydroquinone, hydroxybenzoic acid, and mixtures thereof.

In accordance with one embodiment of the present invention, one or more additives can be added to the starting materials, the polyester, and/or the polyester precursors at one or more locations within the process. Suitable additives can include, for example, trifunctional or tetrafunctional comonomers, such as trimellitic anhydride, trimethylolpropane, pyromellitic dianhydride, pentaerythritol, or other polyacids or polyols; crosslinking or branching agents; colorant; toner; pigment; carbon black; glass fiber; filler; impact modifier; antioxidant; UV absorbent compound; and oxygen scavenging compound.

In general, the polyester production process according to one embodiment of the present invention can comprise two main stages. The first stage reacts starting materials (also referred to herein as "raw materials" or "reactants") into monomers and/or oligomers. The second stage further reacts the monomers and/or oligomers into the final polyester product.

If the starting materials entering the first stage include acid end groups, such as, for example, terephthalic acid or isophthalic acid, the first stage is referred to as esterification. If the starting materials have methyl end groups, such as, for example, dimethyl terephthalate or dimethyl isophthalate, the first stage is referred to as ester exchange or trans-esterification. For simplicity, the term "esterification" as used herein, includes both esterification and ester exchange reactions, but it should be understood that esterification and ester exchange depend on the starting materials. According to one embodiment of the present invention, esterification can take place at a temperature in the range of from about 220° C. to about 300° C., or about 235° C. to about 280° C., or 245° C. to 270° C. and a pressure of less than about 25 psig, or a pressure in the range of from about 1 psig to about 10 psig, or 2 psig to 5 psig. In one embodiment, the average chain length of the monomer and/or oligomer exiting the esterification stage can be less than about 25, from about 1 to about 20, or from 5 to 15.

The second stage of the process can be referred to as the polycondensation stage. The polycondensation stage can be a single step process, or can be divided into a prepolycondensation (or prepolymerization) step and a final (or finishing) polycondensation step. Generally, longer chain polymers can be produced via a multi-stage polycondensation process. The polycondensation stage can be carried out at a temperature in the range of from about 220° C. to about 350° C., or about 240° C. to about 320° C. and a sub-atmospheric (e.g., vacuum) pressure. When polycondensation is carried out in a two-stage process, the prepolymerization (or prepolymer) reactor can convert the monomer exiting the esterification stage into an oligomer having an average chain length in the range of from about 2 to about 40, from about 5 to about 35, or from 10 to 30. The finisher reactor then converts the oligomer/polymer mixture into a final polymer product having the desired average chain length.

In accordance with one embodiment of the present invention, the esterification stage can be carried out in an esterification system comprising at least one esterification zone and at least one distillation zone. In the esterification zone, reactants are subjected to esterification to thereby produce a vapor byproduct and a liquid product containing polyester monomers and/or oligomers. A product portion of the liquid product exiting the esterification zone can exit the esterification system for downstream processing, while a recirculation portion of the liquid product exiting the esterification zone can be recirculated back to the inlet of the esterification zone. At least a portion of the vapor byproduct exiting the esterification zone can be routed to the distillation zone, wherein water and alcohol components of the vapor byproduct can be separated. A portion of the separated alcohol exiting the distillation zone can be recombined with the recirculation portion of the liquid product exiting the esterification zone. The resulting combined stream can then be reintroduced into the esterification zone, after receiving additional quantities of reactants and/or additives.

In one embodiment of the present invention, at least a portion of the esterification zone can be defined by equipment that imparts little or no mechanical agitation to the liquid phase of the reaction medium processed therein. Although the liquid phase of the reaction medium processed in the esterification zone may be somewhat agitated by virtue of flowing through the equipment that defines the esterification zone, in one embodiment of the present invention, less than about 50 percent, less than about 25 percent, less than about 10 percent, less than about 5 percent, or 0 percent of the agitation of the liquid phase reaction medium processed in the esterification zone is provided by mechanical agitation. This is in direct contrast to conventional esterification processes that are carried out in one or more continuous stirred tank reactors (CSTRs) under conditions of extreme mechanical agitation.

As discussed further in detail below, the present invention can employ simple, reliable, and inexpensive equipment for carrying out esterification. For example, in one embodiment of the present invention, at least a portion of the esterification zone can be defined within a simple, reliable, and relatively inexpensive heater, such as, for example, a shell-and-tube heat exchanger. Further, in another embodiment, at least a portion of the esterification zone can be defined within a simple, reliable, and relatively inexpensive unagitated esterification vessel.

Referring now to FIG. 1, an esterification system 10 configured in accordance with one embodiment of the present invention is illustrated as generally comprising a heat exchanger 12, an esterification vessel 14, a distillation column 16, and a recirculation loop 18. In general, the process carried out in esterification system 10 includes the following broad steps: (1) introducing an esterification feed into heat exchanger 12; (2) heating and partially esterifying the esterification feed in heat exchanger 12; (3) introducing at least a portion of the heated and partially esterified product from heat exchanger 12 into esterification vessel 14; (4) further esterifying the partially esterified product from heat exchanger 12 in esterification vessel 14; (5) separating a liquid product from a vapor byproduct in esterification vessel 14; (6) introducing at least a portion of the vapor byproduct from esterification vessel 14 into distillation column 16; (7) separating the vapor byproduct into a predominately water overhead stream and a predominately alcohol bottom stream in distillation column 16; (8) routing a recirculation portion of the liquid product from esterification vessel 14 back to heat exchanger 12 via recirculation loop 18; (9) while the recirculation portion of the liquid product is flowing through recirculation loop 18, adding thereto recirculated alcohol from distillation column 16, fresh alcohol, additive(s), and/or acid; and (10) withdrawing a product portion of the liquid product from esterification vessel 14 for further downstream processing.

As stated above, esterification can be carried out in both heat exchanger 12 and esterification vessel 14 of esterification system 10. Since esterification can be carried out in both heat exchanger 12 and esterification vessel 14, each of these pieces of equipment can be referred to as "esterification reactors" that each define a portion of an "esterification zone." However, because an additional function of heat exchanger 12 can be to heat the reaction medium processed therein, heat exchanger 12 can also be referred to as a "heater" that defines a "heating zone." Further, since an additional function of esterification vessel 14 can be to promote vapor/liquid disengagement, esterification vessel 14 can also be referred to as a "disengagement vessel" that defines a "disengagement zone." The configuration and operation of esterification system 10, illustrated in FIG. 1, will now be described in greater detail.

Referring again to FIG. 1, a recirculated liquid product stream, discussed in more detail below, is transported through a recirculation conduit 100. As illustrated in FIG. 1, the following materials can be added to the recirculated liquid product stream flowing through recirculation conduit 100: (a) recirculated alcohol introduced via conduit 102, (b) additional fresh alcohol introduced via conduit 104, and (c) one or more additives introduced via conduit 106. In another embodiment, at least a portion of one or more streams in conduits 102, 104, and/or 106 can be added to the stream exiting esterification vessel 14 in conduit 114, which is discussed in detail below. In yet another embodiment, at least a portion of one or more streams in conduits 102, 104, and/or 106 can be introduced directly into a yet-to-be-discussed recirculation pump 40. The recirculated and fresh alcohol in conduits 102 and 104 can be any of the alcohols discussed above as being suitable for use as starting materials in the system of the present invention. According to one embodiment, the recirculated and/or fresh alcohol can be ethylene glycol. The one or more additives in conduit 106 can be any of the additives discussed above as being suitable for used in the system of the present invention.

Additional acid from conduit 108 can also be added to the stream flowing through recirculation conduit 100. The acid introduced into recirculation conduit 100 via conduit 108 can be any of the acids discussed above as being suitable for use as starting materials in the system of the present invention. The acid in conduit 108 can be in the form of a liquid, slurry, paste, or dry solids. In one embodiment, the acid in conduit 108 can be solid particles of terephthalic acid.

In one embodiment of the present invention, the acid in conduit 108 is added to the recirculation stream in conduit 100 in the form of small, substantially dry, solid particles (e.g., a powder). In such an embodiment, the acid fed to conduit 100 can contain less than about 5 weight percent, less than about 2 weight percent, or less than 1 weight percent liquid. This method of dry acid addition can eliminate the need for complex and expensive mechanically agitated tanks traditionally used to convert the solid acid particles into a paste or slurry before introducing the resulting mixture into the esterification process.

As illustrated in FIG. 1, a pressure reducer 20 can be employed to permit the direct addition of a solid acid reactant into recirculation conduit 100 without being in the form of a paste or slurry. In one embodiment of the present invention, the solid acid reactant can be added to recirculation conduit 100 at a location where the pressure of the recirculation stream has been reduced via pressure reducer 20. Pressure reducer 20 can be any apparatus known in the art to be capable of reducing the pressure of a primarily fluid stream so that material can be added to the pressure-reduced stream via an opening proximate the zone of reduced pressure. An eductor is one example of an apparatus suitable for use as pressure reducer 20.

As illustrated in FIG. 1, the solid acid reactant in conduit 108 can be added to recirculation loop 18 downstream of the additional alcohol and additive injection points. Further, it can be advantageous to introduce the solid acid reactant into the top portion of recirculation conduit 100 in order to expedite the dissolution of the solid acid particles as they descend into the recirculation stream. The presence of polyester monomers and/or oligomers in the recirculation stream can also enhance the dissolution of the solid acid particles added to recirculation conduit 100. In one embodiment of the present invention, the stream in recirculation conduit 100 can have an average chain length in the range of from about 1 to about 20, about 2 to about 18, or 5 to 15.

Generally, the amount of alcohol and acid added to the recirculation stream in recirculation conduit 100 can any amount necessary to provide the desired production rate and the desired alcohol-to-acid ratio. In one embodiment of the present invention, the molar alcohol-to-acid ratio of the esterification feed stream exiting recirculation conduit 100 is in the range of from about 1.005:1 to about 10:1, about 1.01:1 to about 8:1, or 1.05:1 to 6:1.

The combined stream exiting recirculation conduit 100 and/or pressure reducer 20 can be introduced as an esterification feed into an inlet 22 of heat exchanger 12 via a feed conduit 110. In heat exchanger 12, the esterification feed/reaction medium is heated and subjected to esterification conditions. In accordance with one embodiment of the present invention, the temperature increase of the reaction medium between the inlet 22 and an outlet 24 of heat exchanger 12 can be at least about 50° F., at least about 75° F., or at least 85° F. Generally, the temperature of the esterification feed entering inlet 22 of heat exchanger 12 can be in the range of from about 220° C. to about 260° C., about 230° C. to about 250° C., or 235° C. to 245° C. Generally, the temperature of the esterification product exiting outlet 24 of heat exchanger 12 can be in the range of from about 240° C. to about 320° C., about 255° C. to about 300° C., or 275° C. to 290° C. The reaction medium in heat exchanger 12 can be maintained at a pressure in the range of from about 5 to about 50 psig, from about 10 to about 35 psig, or from 15 to 25 psig.

As discussed previously, heat exchanger 12 can also be considered an esterification reactor because at least a portion of the reaction medium flowing therethrough can undergo esterification. The amount of esterification carried out in accordance with the present invention can be quantified in terms of "conversion." As used herein, the term "conversion" is used to describe a property of the liquid phase of a stream that has been subjected to esterification, wherein the conversion of the esterified stream indicates the percentage of the original acid end groups that have been converted (i.e., esterified) to ester groups. Conversion can be quantified as the number of converted end groups (i.e., alcohol end groups) divided by the total number of end groups (i.e., alcohol plus acid end groups), expressed as a percentage. While conversion is used herein, it should be understood that average chain length, which describes the average number of monomer units that a compound comprises, could also be appropriate for describing the characteristics of the streams of the present invention as well.

According to one embodiment, the esterification reaction carried out in heat exchanger 12 can increase the conversion of the reaction medium between inlet 22 and outlet 24 by at least about 5, at least about 10, at least about 15, at least about 20, at least about 30, or at least about 50 percentage points. Generally, the esterification feed stream introduced into inlet 22 of heat exchanger 12 has a conversion of less than about 90 percent, less than about 75 percent, less than about 50 percent, less than about 25 percent, less than about 10 percent, or less than 5 percent, while the esterification product stream exiting outlet 24 of heat exchanger 12 has a conversion of at least about 50 percent, at least about 60 percent, at least about 70 percent, at least about 75 percent, at least about 80 percent, at least about 85 percent, at least about 95 percent, or at least 98 percent.

In one embodiment of the present invention, the esterification reaction carried out in heat exchanger 12 takes place at a significantly reduced residence time relative to conventional esterification processes. For example, the average residence time of the reaction medium flowing through heat exchanger 12 can be less than about 60 minutes, less than about 45 minutes, less than about 35 minutes, or less than 20 minutes. This relatively short residence time can even be achieved at high, commercial scale production rates. Thus, in one embodiment, the product stream exits outlet 24 of heat exchanger 12 at a flow rate of at least about 10,000 pounds per hour (lb/h), at least about 25,000 lb/h, at least about 50,000 lb/h, or at least 100,000 lb/h.

Turning now the specific configuration of heat exchanger 12. In accordance with one embodiment of the present invention, heat exchanger 12 can be a horizontally elongated, shell-and-tube heat exchanger. An internal flow passageway through heat exchanger 12 can be defined by the heat exchange tubes through which the reaction medium flows as it is heated and esterified. This internal flow passageway can be considered to be a "first esterification zone" of esterification system 10. Generally the aggregate volume of the internal flow passageway through heat exchanger can be in the range of from about 10 to about 1,500 cubic feet (ft$^3$), about 100 to about 800 ft$^3$, or 200 to about 600 ft$^3$. The average inner diameter of the individual heat exchange tubes can be less than about 4 inches, or in the range of from about 0.25 to about 3 inches, or 0.5 to 2 inches.

As shown in FIG. 1, a stream of warmed heat transfer medium (HTM) can enter the shell-side of heat exchanger 12 and at least partly surround at least a portion of the heat exchange tubes in order to heat the reaction medium flowing therethrough. In one embodiment of the present invention, the heat transfer coefficient associated with the heating of the reaction medium in heat exchanger 12 can be in the range of from about 0.5 to about 200 BTU per hour per ° F. per square foot (BTU/h·° F.·ft$^2$), about 5 to about 100 BTU/h·° F.·ft$^2$, or from 10 to 50 BTU/h·° F.·ft$^2$. The total amount of heat transferred to the reaction medium in heat exchanger 12 can be in the range of from about 100 to about 5,000 BTU per pound of reaction medium (BTU/lb), about 400 to about 2,000 BTU/lb, or 600 to 1,500 BTU/lb.

As depicted in FIG. 1, the partially esterified product exiting heat exchanger 12 via outlet 24 can be transported to esterification vessel 14 via conduit 112. The partially esterified stream in conduit 112 can be introduced into the internal volume of esterification vessel 14 via a fluid inlet 26. As discussed previously, in esterification vessel 14, the partially esterified stream is subjected to further esterification and phase separation. Thus, the internal volume defined within esterification vessel can be considered to be a "second esterification zone" and/or a "disengagement zone." Generally, the reaction medium in esterification vessel 14 flows substantially horizontally through the internal volume. As the reaction medium flows away from fluid inlet 26 and undergoes esterification, vapor byproducts escape the liquid phase and flow generally above the liquid phase. The separated liquid product can exit esterification vessel 14 via a liquid outlet 28, while the separated vapor byproduct can exit esterification vessel 14 via vapor outlet 30.

The esterification reaction carried out in esterification vessel 14 can increase the conversion of the reaction medium processed therein so the liquid product exiting liquid outlet 28 has a conversion that is at least about 1 percentage point, at least about 2 percentage points, or at least 5 percentage points higher than the conversion of the fluid stream entering fluid inlet 26. Generally, the liquid product exiting liquid outlet 28 of esterification vessel 14 can have conversion of at least about 80 percent, at least about 85 percent, at least about 90 percent, at least 95 percent, or at least about 98 percent.

The conversion achieved in esterification vessel 14 can occur during a relatively short residence time and with little or no heat input. For example, the average residence time of the reaction medium in esterification vessel 12 can be less than about 200 minutes, less than about 60 minutes, less than about 45 minutes, less than about 30 minutes, or less than 15 minutes. Further, the amount of heat transferred to the reaction medium in esterification vessel 14 can be less than about 100 BTU per pound of reaction medium (BTU/lb), less than about 20 BTU/lb, less than about 5 BTU/lb, or less than 1 BTU/lb.

With minimal or no heat input in esterification vessel 14, the average temperature of the liquid product exiting liquid outlet 28 of esterification vessel 14 can be within about 50° C., about 30° C., about 20° C., or 15° C. of the average temperature of the fluid entering esterification vessel 14 via fluid inlet 26. Generally, the average temperature of the liquid product exiting liquid outlet 28 of esterification vessel 14 can be in the range of from about 220° C. to about 320° C., about 240° C. to about 300° C., or about 250° C. to about 275° C.

Turning now to the specific configuration of esterification vessel 14. In the embodiment illustrated in FIG. 1, esterification vessel 14 is a substantially empty, unagitated, unheated, generally cylindrical, horizontally elongated vessel. Esterification vessel 14 and can have a length-to-diameter (L:D) ratio of less than about 10:1, in the range of from about 1.25:1 to about 8:1, about 1.5:1 to about 6:1, or 2:1 to 4.5:1. In one embodiment, fluid inlet 26, liquid outlet 28, and vapor outlet 30 are spaced from on another in a manner that provides sufficient esterification and enhances disengagement/separation of the vapor, liquid, and foam phases. For example, liquid outlet 28 and vapor outlet 30 can be horizontally spaced from the fluid inlet 26 by at least about 1.25D, at least about 1.5D, or at least 2.0D. Further, liquid outlet 28 and vapor outlet 30 can be vertically spaced from one another by at least about 0.5D, at least about 0.75D, or at least 0.95D.

As illustrated in FIG. 1, esterification vessel 14 can comprise a fluid distributor 32 to aid in the effective distribution of the feed to esterification vessel 14. In the embodiment illustrated in FIG. 1, fluid distributor is simply a substantially horizontally extending pipe having a downwardly curved distal end that defines fluid inlet 26 with a downwardly facing orientation. Alternatively, fluid distributor 32 can define a plurality of openings for discharging the partially esterified feed at multiple horizontally spaced locations in esterification vessel 14. In one embodiment of the present invention, the average depth of the reaction medium in esterification vessel 14 is maintained at less than about 0.75D, less than about 0.50D, less than about 0.25D, or less than 0.15D as it travels substantially horizontally through esterification vessel 14.

As shown in FIG. 1, upon entering esterification vessel 14, the reaction medium exiting fluid distributor 32 can begin to foam as the vapor bubbles disengage from the liquid portion of the reaction medium. Generally, foam production can decrease along the length of esterification vessel 14 as the vapor disengages from the liquid phase of the reaction medium so that, in one embodiment, substantially no foam exits liquid outlet 28 and/or vapor outlet 30 of esterification vessel 14.

To help ensure that substantially no foams exits vapor outlet 30 of esterification vessel 14, a downwardly extending baffle 34 can be employed in esterification vessel 14. Baffle 34 can generally be disposed between fluid inlet 26 and vapor outlet 30 of esterification vessel 14, but closer to vapor outlet 30 than to fluid inlet 26. Baffle 34 can extend downwardly from the top of esterification vessel 14 proximate vapor outlet 30 and can function to physically block the flow of foam, if any, towards vapor outlet 30. In one embodiment of the present invention, baffle 34 can present a bottom edge vertically spaced at least about 0.25D, at least about 0.5D, or at least 0.75D from the bottom of esterification vessel 14. In the embodiment illustrated in FIG. 1, baffle includes a downwardly extending portion 36 and a laterally extending portion 38. Downwardly extending portion 36 can extend downwardly from a location proximate vapor outlet 30, while laterally extending portion 38 can extend transversely from the bottom end of downwardly extending portion 36 to a location generally under vapor outlet 30.

The total internal volume defined within esterification vessel 14 can depend on a number of factors, including, for example, the overall hydrodynamic requirements of esterification system 10. In one embodiment of the present invention, the total internal volume of esterification vessel 14 can be at least about 25 percent, at least about 50 percent, at least about 75 percent, at least about 100 percent, or at least 150 percent of the total internal volume of recirculation loop 18, described in further detail below. In yet another embodiment of the present invention, the total internal volume of esterification vessel 14 can be at least about 25 percent, at least about 50 percent, at least about 75 percent, or at least 150 percent of the aggregate internal volume of recirculation loop 18, the flow passageway within heat exchanger 12, and product conduit 112.

Referring again to FIG. 1, a liquid ester product can exit liquid outlet 28 of esterification vessel 14 and can thereafter be introduced into recirculation loop 18. Recirculation loop 18 defines a flow passageway from liquid outlet 28 of esterification vessel 14 to inlet 22 of heat exchanger 12. Recirculation loop 18 generally comprises a liquid product conduit 114, a recirculation pump 40, a pump discharge conduit 116, recirculation conduit 100, pressure reducer 20, and feed conduit 110. The liquid ester product discharged from esterification vessel 14 can flow initially through product conduit 114 to the suction of recirculation pump 40. The stream exiting pump 40 can be passed though pump discharge conduit 116 and thereafter split into a product portion transported via ester product conduit 118 and a recirculation portion transported via recirculation conduit 100. The splitting of the stream exiting pump 40 can be carried out so that the ratio of the mass flow rate of the recirculation portion in conduit 100 to the mass flow rate of the product portion in conduit 118 can be in the range of from about 0.25:1 to about 30:1, about 0.5:1 to about 20:1, or 2:1 to 15:1. As previously discussed, the recirculation portion in conduit 100 can eventually be employed as the feed to heat exchanger 12, after the addition of recirculation alcohol via conduit 102, fresh alcohol via conduit 104, additive(s) via conduit 106, and/or acid via conduit 108.

The product portion of the liquid ester product in conduit 118 can be routed to a downstream location for further processing, storage, or other use. In one embodiment, at least a fraction of the product portion in conduit 118 can be subjected to further esterification in a second esterification zone. In another embodiment, at least part of the product portion in conduit 118 can be subjected to polycondensation in a downstream polycondensation zone.

As illustrated in FIG. 1, the vapor stream exiting vapor outlet 30 of esterification vessel 14 via conduit 120 can be routed to a fluid inlet 42 of distillation column 16. The vapor byproduct stream in conduit 120 can comprise water and alcohol. The water and alcohol can be substantially separated from one another in distillation column 16 to thereby produce a predominately water overhead vapor stream exiting distillation column 16 via overhead outlet 44 and a predominately alcohol bottom liquid stream exiting distillation column 16 via lower outlet 46. Distillation column 16 can be any device capable of separating a stream into a predominantly vapor overhead product and a predominantly liquid bottoms product based on the relative volatilities of the components of the feed stream. Distillation column 16 can comprise internals such as, for example, trays, random packing, structured packing, or any combination thereof.

According to one embodiment of the present invention, the predominantly water overhead vapor stream exiting distillation column 16 via overhead outlet 44 can comprises at least about 50 mole percent, at least about 60 mole percent, or at least 75 mole percent water. The overhead vapor product discharged from outlet 44 of distillation column 16 can be routed via conduit 122 to subsequent processing, storage, or disposal, such as, for example, a wastewater processing unit or a disposal means employing, for example, incineration.

The predominately alcohol bottom liquid stream exiting distillation column 14 via lower outlet 46 can comprise at least about 50 mole percent, at least about 60 mole percent, or at least 75 mole percent alcohol (e.g., ethylene glycol). In one embodiment of the present invention, the predominantly alcohol stream withdrawn from lower outlet 46 of distillation column 16 can have a temperature of at least about 150° C., in the range of from about 175° C. to about 250° C., or 190° C. to 230° C. and a pressure in the range of from about 0.25 psig to about 50 psig, about 0.5 psig to about 35 psig, or 1 psig to 25 psig. As shown in FIG. 1, the liquid stream discharged from lower outlet 46 of distillation column can be transported in separated liquid conduit 124 and thereafter split into a recirculated alcohol portion carried in conduit 102 and an a recovered alcohol portion carried in conduit 126. The separated liquid stream from conduit 124 can be split in a manner such that the mass flow rate of the recirculated alcohol in conduit 102 can be at least about 25 percent, at least about 50 percent, or at least 75 percent of the mass flow rate of the separated liquid product in conduit 124. The recovered alcohol in conduit 126 can be routed to further processing, storage, or reuse. The recirculated alcohol in conduit 102 can be routed to recirculation loop 18 for combination with the recirculated portion of the esterification product flowing through recirculation conduit 100, as previously described.

Conventional esterification systems require cooling of recirculated alcohol prior to reintroduction into the recirculated ester product. However, in accordance with one embodiment of the present invention, when combined with the recirculated esterification product stream flowing through conduit 116 in recirculation conduit 100, the temperature of the recirculated alcohol stream is not more than about 100° C., not more than about 75° C., not more than about 50° C., or not more than 25° C. cooler than the temperature of the alcohol stream when it was withdrawn from lower outlet 46 of distillation column 16. In one embodiment, the temperature of the recirculated alcohol stream when combined with the recirculated ester product stream in recirculation conduit 100 is in the range of from about 190° C. to about 250° C., about 200° C. to about 235° C., or 205° C. to 220° C.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claims limitation that only recite the upper value of the range. For example, a disclosed numerical range of 10 to 100 provides literal support for a claim reciting "greater than 10" (with no upper bounds) and a claim reciting "less than 100" (with no lower bounds).

Definitions

As used herein, the terms "a," "an," "the," and "said" means one or more.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the terms "comprising," "comprises," and "comprise" are open-ended transition terms used to transition from a subject recited before the term to one or elements recited after the term, where the element or elements listed after the transition term are not necessarily the only elements that make up of the subject.

As used herein, the terms "containing," "contains," and "contain" have the same open-ended meaning as "comprising," "comprises," and "comprise," provided below.

As used herein, the term "distillative separation" refers to separating one or more chemical substances from one or more other chemical substances based on the relative volatilities of the substances being separated.

As used herein, the terms "having," "has," and "have" have the same open-ended meaning as "comprising," "comprises," and "comprise," provided above As used herein, the terms "including," "includes," and "include" have the same open-ended meaning as "comprising," "comprises," and "comprise," provided above.

As used herein, the term "reaction medium" refers to a mixture of starting materials, monomer, oligomer, and/or polymer.

As used herein, the term "residue" refers to the moiety that is the resulting product of the chemical species in a particular reaction scheme or subsequent formulation or chemical product, regardless of whether the moiety is actually obtained from the chemical species.

Claims not Limited to Disclosed Embodiments

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

What is claimed is:

1. A process for producing a polymer, said process comprising:
   (a) subjecting a reaction medium to esterification in an esterification zone to thereby produce a first vapor product and a first liquid product, wherein a first portion of said esterification zone is defined within a heat exchanger and a second portion of said esterification zone is defined within a disengagement vessel, wherein said disengagement vessel is horizontally elongated and has a length-to-diameter ratio (L:D) of less than 10:1;
   (b) subjecting at least a portion of said first vapor product to distillative separation in a distillation zone, comprising a single column, to thereby produce a second vapor product and a second liquid product, wherein all of the first vapor product that is subject to distillative separation is through said single column;
   (c) upstream of said esterification zone, combining at least a portion of said second liquid product from said single column with at least a portion of said first liquid product to thereby produce a combined liquid, wherein the temperature of said second liquid product when combined with said first liquid product is in the range of from about 175° C. to about 250° C.; and
   (d) introducing an esterification feed comprising at least a portion of said combined liquid into said first portion of said esterification zone.

2. The process of claim 1, wherein the temperature of said combined stream is at least about 190° C. when said combined liquid is introduced into said first portion of said esterification zone.

3. The process of claim 1, wherein the temperature of said second liquid product when combined with said first liquid product is not more than about 50° C. cooler than the temperature of said second liquid product when withdrawn from said single distillation column.

4. The process of claim 1, wherein said second liquid product comprises an alcohol.

5. The process of claim 4, wherein said alcohol comprises a diol.

6. The process of claim 4, wherein said second liquid product has a higher molar concentration of said alcohol than said second vapor product.

7. The process of claim 6, wherein said alcohol comprises ethylene glycol and said second vapor product comprises water.

8. The process of claim 1, wherein said first liquid product has a conversion of at least about 80 percent.

9. The process of claim 8, wherein said first liquid product has an average chain length in the range of from about 2 to about 18.

10. The process of claim 1, wherein said first liquid product comprises an ester product produced by said esterification, further comprising separating a product portion of said ester product from a recirculated portion of said ester product, wherein said esterification feed comprises at least a portion of said recirculated portion of said ester product.

11. The process of claim 10, further comprising subjecting said product portion of said ester product to further esterification in a second esterification zone and/or to polycondensation in a polycondensation zone.

12. The process of claim 10, further comprising adding an acid to a liquid stream comprising at least a portion of said recirculated portion of said ester product, wherein said esterification feed comprises at least a portion of said acid.

13. The process of claim 12, wherein said acid comprises a dicarboxylic acid.

14. The process of claim 12, wherein said acid comprises terephthalic acid.

15. The process of claim 12, wherein said acid is added to said liquid stream as a solid.

16. The process of claim 15, wherein said ester product aids in the dissolution of said acid in said liquid stream.

17. The process of claim 12, wherein said acid is not in the form of a slurry or paste when added to said liquid stream.

18. The process of claim 12, further comprising reducing the pressure of said liquid stream and introducing said acid into said liquid stream at a location of reduced pressure.

19. The process of claim 12, wherein said acid is introduced into said liquid stream using an eductor.

20. The process of claim 12, wherein said second liquid product comprises a recirculated alcohol, further comprising adding additional fresh alcohol to said recirculation portion of said ester product, wherein said esterification feed comprises said recirculated alcohol and said fresh alcohol.

21. The process of claim 20, wherein said recirculated alcohol and said fresh alcohol both comprise a diol.

22. The process of claim 20, wherein said recirculated alcohol and said fresh alcohol both comprise ethylene glycol.

23. The process of claim 1, wherein said heat exchanger comprises a horizontally-elongated heat exchanger comprising a plurality of tubes at least partly surrounded by a heat transfer medium, wherein said reaction medium flows through said tubes.

24. The process of claim 23, wherein said reaction medium exits said tubes having a conversion of at least about 50 percent.

25. The process of claim 1, wherein said heat exchanger is a shell-and-tube heat exchanger, wherein said disengagement vessel has a L:D ratio in the range of from about 1.5:1 to about 6:1, wherein said esterification takes place in both said heat exchanger and said disengagement vessel, wherein said reaction medium exiting said heat exchanger has a conversion of at least about 50 percent, wherein the conversion of said first liquid product exiting said disengagement vessel is at least about 2 percentage points greater than the conversion of said reaction medium exiting said heat exchanger.

26. The process of claim 1, further comprising, optionally, agitating said reaction medium in said esterification zone wherein less than about 50 percent of the agitation in said first and/or second portion of said esterification zone is provided by mechanical agitation.

27. The process of claim 1, further comprising using a recirculation pump to pump at least a portion of said first liquid product toward said esterification zone, further comprising adding an alcohol into said pump during said pumping, wherein said alcohol added into said pump is fresh alcohol from outside said process and/or recirculated alcohol from said single distillation column.

28. A process for producing a polymer, said process comprising:
(a) subjecting a reaction medium comprising terephthalic acid and ethylene glycol to esterification in a first esterification zone defined within the tubes of a shell-and-tube heat exchanger to thereby produce a first liquid product having a conversion of at least about 50 percent;
(b) subjecting at least a portion of said first liquid product to further esterification in a second esterification zone defined within an esterification reactor to thereby produce a second liquid product and a second vapor product, wherein said second liquid product has a higher conversion than said first liquid product, wherein said esterification reactor defines a fluid inlet for receiving said first liquid product, a vapor outlet for discharging said second vapor product, and a liquid outlet for discharging said second liquid product, wherein said vapor outlet is horizontally spaced from said fluid inlet by a distance greater than the maximum vertical dimension (D) of said esterification reactor, wherein the ratio of the length (L) to the maximum vertical dimension (D) of said esterification reactor is less than about 10:1,
(c) subjecting at least a portion of said second vapor product to distillative separation in a distillation zone comprising a single column, to thereby produce a third vapor product and a third liquid product, wherein said third vapor product comprises at least about 50 mole percent water and said third liquid product comprises at least about 50 mole percent ethylene glycol and all of the second vapor product that is subject to distillative separation is through said single column;
(d) upstream of said first esterification zone, combining at least a portion of said third liquid product from said single column with at least a portion of said second liquid product to thereby produce a combined liquid, wherein the temperature of said third liquid product when combined with said second liquid product is in the range of from 190° C. to 230° C.; and
(e) introducing at least a portion of said combined liquid and at least a portion of said terephthalic acid introduced upstream of said first esterification zone into said first esterification zone.

29. The process of claim 28, wherein the temperature of said combined liquid is at least about 190° C. when said combined liquid is introduced into said first esterification zone.

30. The process of claim 28, wherein the temperature of said third liquid product when combined with said second liquid product is not more than 50° C. cooler than the temperature of said third liquid product when withdrawn from said single distillation column.

31. The process of claim 28, further comprising separating a recovered portion of said second liquid product from a recirculated portion of said second liquid product, wherein said combining of step (d) includes combining at least a portion of said third liquid product with said recirculated portion of said second liquid product to thereby produce said combined liquid.

32. The process of claim 31, further comprising adding said solid particles of terephthalic acid to said combined liquid, wherein said recirculated portion of said combined liquid aids in the dissolution of said solid particles of terephthalic acid.

33. The process of claim 32, wherein said solid particles of terephthalic acid are introduced into said combined liquid using an eductor.

34. The process of claim 28, further comprising, optionally, agitating said reaction medium in said first and/or second esterification zones, wherein less than about 50 percent of the total agitation in said first and second esterification zones is provided by mechanical agitation.

* * * * *